UNITED STATES PATENT OFFICE.

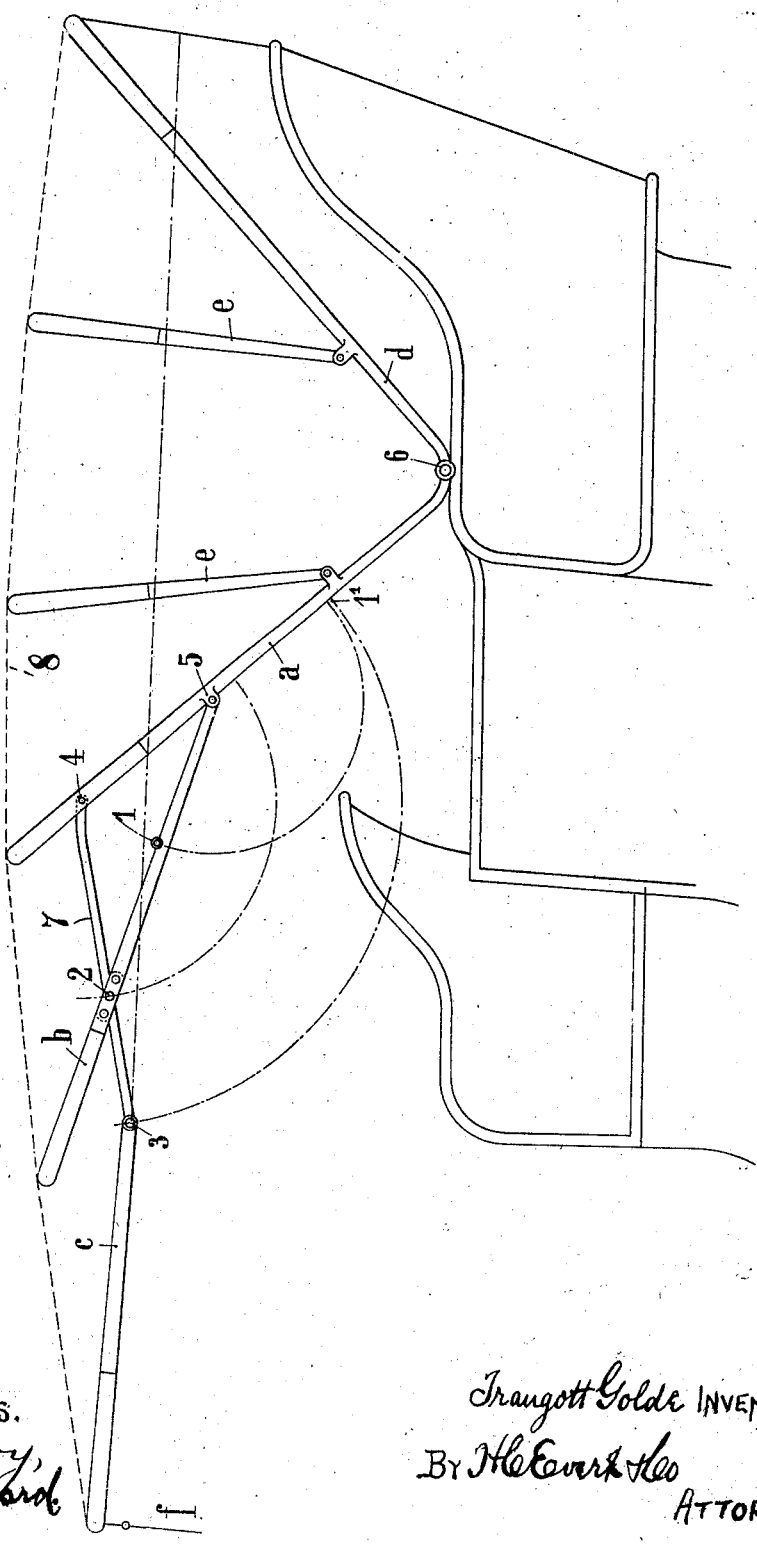

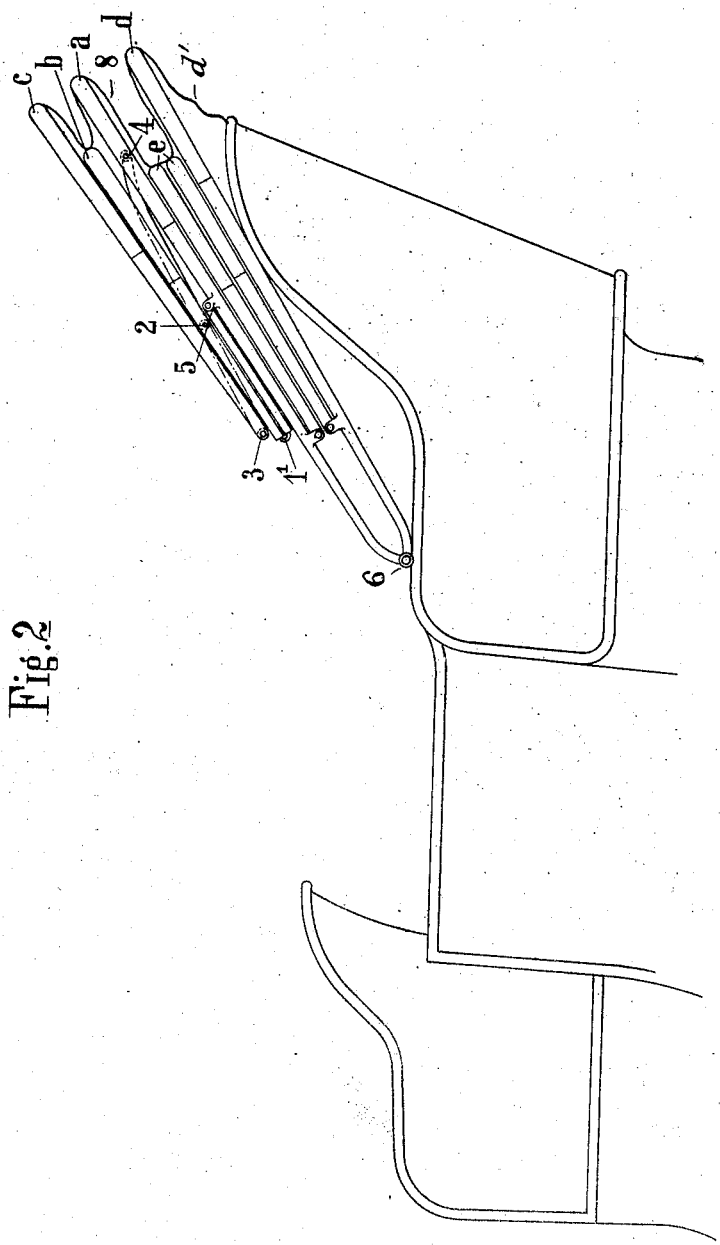

TRAUGOTT GOLDE, OF GERA-REUSS, GERMANY.

CARRIAGE-HOOD.

No. 878,948.  Specification of Letters Patent.  Patented Feb. 11, 1908.

Application filed February 11, 1907. Serial No. 356,909.

*To all whom it may concern:*

Be it known that I, TRAUGOTT GOLDE, a subject of the Prince of Reuss, of the German Empire, residing at Gera-Reuss, Schillerstrasse 14–16, Germany, have invented certain new and useful Improvements in Carriage-Hoods, of which the following is a specification, reference being had therein to the accompanying drawings.

In the evolution of the modern automobile carriage body, the tonneau form, with the entrance door at the rear has been to a considerable extent superseded by the more recent form wherein the door is arranged at the side of the vehicle. This new form of vehicle body has, however, rendered the construction and arrangement of a satisfactory hood a somewhat more difficult matter, since it has been necessary either to attach the cover to the body by means of several separate supports, or to attach it at one point only on each side of the vehicle, in such manner that it does not, when collapsed, obstruct the entry or exit from the vehicle. Should the latter arrangement be chosen, it is consequently necessary that the cover should be pivoted to the rear of the entrance door; and this again renders it necessary that the hood should project forward far beyond its points of support so as to cover the driver's seat.

Now this invention relates to a carriage hood, the supporting hoops of which are pivoted on each side at a point towards the rear of the carriage body, and behind the door of the vehicle, while towards the front thereof there extends an auxiliary cover that is carried by a number of auxiliary hoops arranged after the manner of a rudimentary lazy-tongs and adapted to be collapsed by the bending of a single joint at each side of the top.

Figures 1 and 2 of the accompanying drawings illustrate, in side elevation, an example of hood in accordance with this invention, respectively in its extended and in its collapsed position showing the awning in dotted lines.

The awning or cover of the top is carried by a pair of main hoops $a$ and $d$, and is supported between these main hoops, when the awning or cover is extended, by auxiliary hoops $e$ pivoted at their ends to the said main hoops $a$ and $d$ respectively. The main hoops $a$ and $d$ are pivoted at their ends, as at 6, to the body of the vehicle, preferably at a point directly in the rear of the door through which the vehicle is entered. The main hoop $d$ supports the rear hanging $d'$ which may be of linen, while the cover or awning 8 may be of canvas or like material.

In connection with the hoops above described, I employ two outrigger hoops $b$ and $c$. The outrigger hoop $b$ is pivoted at 5 to the main hoop $a$, the side arms of this outrigger hoop $b$ being broken or jointed at 1, which joint may be in the form of a hinge or a knife joint. The outrigger hoop $c$ is pivoted at its ends as shown at 3 to the outer ends of arms 7, the inner ends of these arms being pivoted as at 4 to the main hoop $a$, and being also pivoted at the point 2 where they cross the outrigger hoop $b$; the auxiliary hoop $c$ is preferably held down by means of a cord $f$ in front of the driver's seat.

When it is desired to fold the top, the joint 1 at each side of the outrigger hoop $b$ is broken, being pulled downwardly so that it collapses in the direction of point 1'. At the same time the arm 7 is brought against the main hoop $a$, the pivoted joint 3 being brought adjacent to the joint 1'. The main hoop $a$, may now be folded back, carrying with it the outrigger hoops $b$ and $c$ and the auxiliary hoops $e$, moving all of the hoops to the position shown in Fig. 2 of the drawing. The collapse of the hood is thus effected by simply bending or breaking the joint 1, at each side of the top and then forcing rearwardly on the main hoop $a$. It will be evident that by the reverse operation the top may be again extended.

It will also be observed that when in the extended position the weight of the top forward on the joint 1 tends to prevent the breaking of this joint, the break thereof being effected in one position only, namely, downwardly.

I claim:

1. A folding top comprising main hoops and auxiliary hoops pivoted thereto, and outrigger hoops one of which is pivoted at its ends to the forward main hoop and has break-joints in its side arms, supporting arms pivoted to said forward main hoop, and at their outer ends having the other of said outrigger hoops pivoted thereto, and being pivotally connected between their ends to the first mentioned outrigger hoop.

2. In a folding top for vehicles, a main front hoop and main rear hoop pivoted to the body of the vehicle, an outrigger hoop pivoted at its ends to the front main hoop and having breakable joints in its side arms, supporting arms pivoted to the front main hoop and to said outrigger hoop, and a second outrigger hoop pivoted to the forward ends of said supporting arms.

In testimony whereof I affix my signature in the presence of two witnesses.

TRAUGOTT GOLDE.

Witnesses:
M. NAUMANN,
CHARLES NEUER.